(12) United States Patent
Gemba et al.

(10) Patent No.: US 10,175,368 B2
(45) Date of Patent: Jan. 8, 2019

(54) DETECTOR FOR COMPTON CAMERA AND COMPTON CAMERA

(71) Applicants: MITSUBISHI HEAVY INDUSTRIES, LTD., Tokyo (JP); Japan Aerospace Exploration Agency, Tokyo (JP)

(72) Inventors: Kei Gemba, Tokyo (JP); Yoshikatsu Kuroda, Tokyo (JP); Hiroshi Ikebuchi, Tokyo (JP); Daisuke Matsuura, Tokyo (JP); Tadayuki Takahashi, Kanagawa (JP); Shin Watanabe, Kanagawa (JP); Shin'ichiro Takeda, Kanagawa (JP)

(73) Assignees: MITSUBISHI HEAVY INDUSTRIES, LTD., Tokyo (JP); JAPAN AEROSPACE EXPLORATION AGENCY, Tokyo (JP)

( * ) Notice: Subject to any disclaimer, the term of this patent is extended or adjusted under 35 U.S.C. 154(b) by 51 days.

(21) Appl. No.: 15/329,770

(22) PCT Filed: Jul. 31, 2015

(86) PCT No.: PCT/JP2015/071779
§ 371 (c)(1),
(2) Date: Jan. 27, 2017

(87) PCT Pub. No.: WO2016/021493
PCT Pub. Date: Feb. 11, 2016

(65) Prior Publication Data
US 2017/0212254 A1    Jul. 27, 2017

(30) Foreign Application Priority Data
Aug. 4, 2014   (JP) .................... 2014-159046

(51) Int. Cl.
*G01T 1/29*   (2006.01)
*G01T 1/24*   (2006.01)

(52) U.S. Cl.
CPC ............... *G01T 1/29* (2013.01); *G01T 1/242* (2013.01)

(58) Field of Classification Search
CPC ...................................... G01T 1/29
See application file for complete search history.

(56) References Cited

U.S. PATENT DOCUMENTS 5,567,944 A * 10/1996 Rohe ............... G01T 1/2985
250/363.03
5,821,541 A * 10/1998 Tumer .............. G01T 1/006
250/370.09

(Continued)

FOREIGN PATENT DOCUMENTS

EP    2 060 932    5/2009
JP    2010-48699   3/2010

(Continued)

OTHER PUBLICATIONS

International Preliminary Report on Patentability dated Feb. 16, 2017 in corresponding International Application No. PCT/JP2015/071779 (with English translation).

(Continued)

*Primary Examiner* — Yara B Green
(74) *Attorney, Agent, or Firm* — Wenderoth, Lind & Ponack, L.L.P.

(57) ABSTRACT

A detector for a Compton camera includes a first radiation scattering layer; a second radiation scattering layer; and a radiation absorption layer disposed between the first radiation scattering layer and the second radiation scattering layer. The first radiation scattering layer and the radiation absorption layer configure at least a part of a first detector, and the second radiation scattering layer and the radiation absorption layer configure at least a part of a second detector.

16 Claims, 9 Drawing Sheets

(56) References Cited

U.S. PATENT DOCUMENTS

| | | | |
|---|---|---|---|
| 6,236,050 B1* | 5/2001 | Turner | G01T 1/006 250/363.03 |
| 2002/0011571 A1* | 1/2002 | Lin | G01T 1/2018 250/366 |
| 2002/0036270 A1* | 3/2002 | Turner | G01T 1/006 250/370.09 |
| 2008/0128631 A1* | 6/2008 | Suhami | G01T 5/02 250/370.09 |
| 2010/0301221 A1 | 12/2010 | Nakamura | |
| 2010/0302533 A1 | 12/2010 | Fehrenbacher et al. | |
| 2011/0260071 A1 | 10/2011 | Yamaguchi et al. | |
| 2012/0140887 A1* | 6/2012 | Mundy | A61N 5/1048 378/65 |
| 2014/0110592 A1* | 4/2014 | Nelson | G01T 1/1611 250/370.09 |

FOREIGN PATENT DOCUMENTS

| | | |
|---|---|---|
| JP | 2013-33009 | 2/2013 |
| WO | 2008/139625 | 11/2008 |
| WO | 2009/062639 | 5/2009 |

OTHER PUBLICATIONS

Extended European Search Report dated Jun. 28, 2017 in corresponding European Application No. 15828957.9.

H. Odaka et al., "Development of an integrated response generator for Si/CdTe semiconductor Compton cameras", Nuclear Instruments and Methods in Physics Research A, vol. 624, No. 2, Dec. 2010, pp. 303-309.

International Search Report dated Oct. 20, 2015 in corresponding International Application No. PCT/JP2015/071779.

http://www.hitachi-ce.co.jp/product/gamma_detector/, Product information: Gamma camera (radiation measuring device), Hitachi Consumer Electronics Inc., (Searched on Oct. 29, 2013) (with English translation).

Super-wide angle Compton camera, http://www.jaxa.jp/press/2012/03/20120329_compton_1.pdf, (attached papers 1 of press release: about the proof examination (Mar. 29, 2012) to visualization of radioactive substances by "super-wide angle Compton camera": the space aerial studies and development mechanism (Searched on Oct. 29, 2013) (with English translation).

* cited by examiner

Fig. 1

PRIOR ART

Fig. 2

PRIOR ART

PRIOR ART

DETECTOR FOR COMPTON CAMERA AND COMPTON CAMERA

TECHNICAL FIELD

The present invention relates to a detector for a Compton camera and the Compton camera.

BACKGROUND ART

A radiation detection apparatus that detects radiation radiated from substance is known. For example, Patent Literature 1 (JP 2013-33009A) discloses a gamma camera system. This gamma camera system includes a gamma camera, a distance measuring unit, a position calculating unit, a sensitivity correction information estimating unit, a resolution correction information estimating unit and an image production calculating unit. The gamma camera has a gamma ray detector and a collimator. The distance measuring unit can measure a distance to an imaging object of the gamma camera. The position calculating unit calculates position relation based on the distance between the gamma camera and the imaging object of the gamma camera, which is obtained through scan measurement of the distance measuring unit. The sensitivity correction information estimating unit estimates measurement sensitivity when measuring the imaging object with the gamma camera, based on the position relation obtained from the position calculating unit. The resolution correction information estimating unit estimates the resolution when measuring the imaging object with the gamma camera, based on the position relation obtained from the position calculating unit. The image production calculating unit produces a gamma ray distribution image based on the measurement sensitivity estimated by the sensitivity correction information estimating unit, the resolution estimated by the resolution correction information estimating unit and gamma ray count data detected by the gamma camera.

Figure 1:
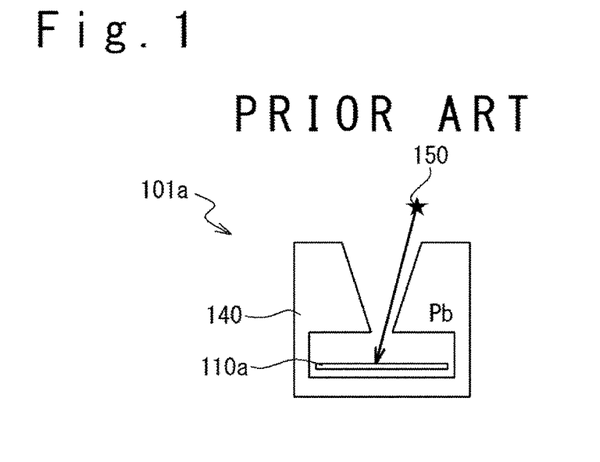
FIG. 1 is a diagram schematically showing a gamma camera system of Patent Literature 1.
Figure 2:
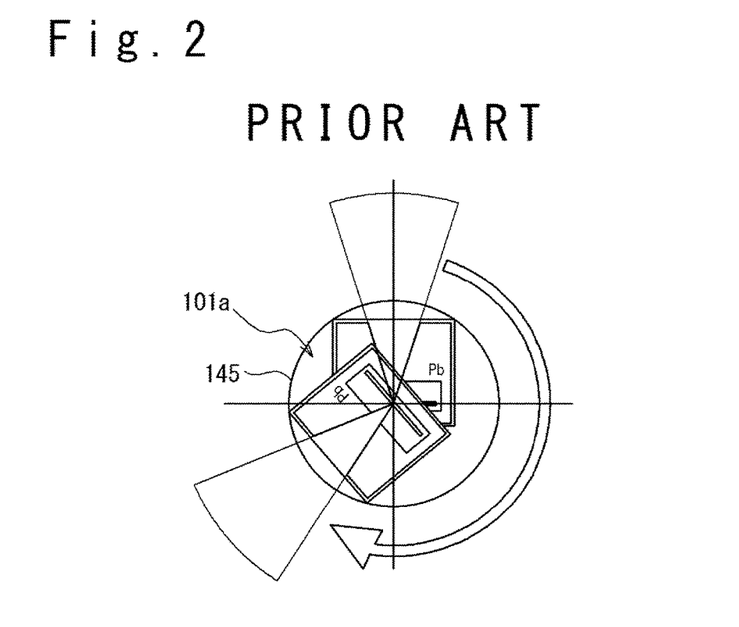
FIG. 2 is a diagram schematically showing an operation of the gamma camera system of FIG. 1.

FIG. 1 is a diagram schematically showing this gamma camera system. The gamma camera system 101a is of a pinhole camera type. Therefore, the viewing angle of the detector 110a to a radiation source 150 is prescribed by the aperture angle of pinhole collimator 140, to limit to 40°-60°. Therefore, in order to measure in the direction of full circumference (360°), it is necessary that the gamma camera system 101a is set on a turn-table 145 and the measurement is carried out a plurality of times (six times if the viewing angle is 60°) while turning the turn-table 145, as shown in FIG. 2. Such a system having the turn-table is disclosed in Non-Patent Literature 1 ((http://www.hitachi-ce.co.jp/product/gamma_detector/).

Figure 3A:
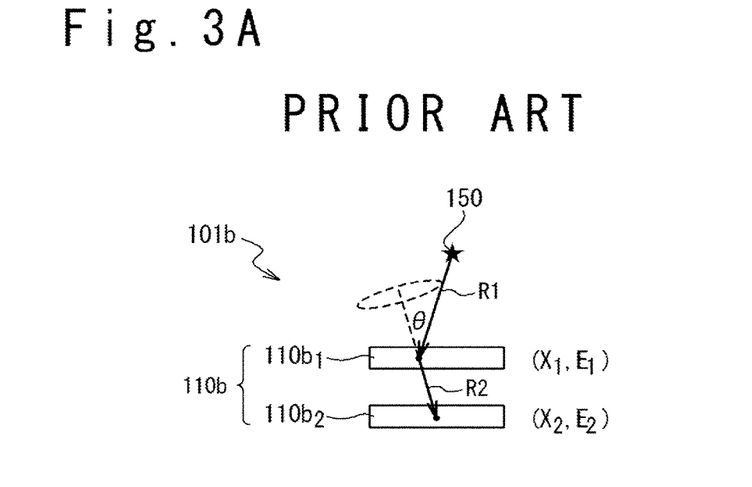
FIG. 3A is a diagram schematically showing an operation principle of a Compton camera of Non-Patent Literature 2.
Figure 3B:
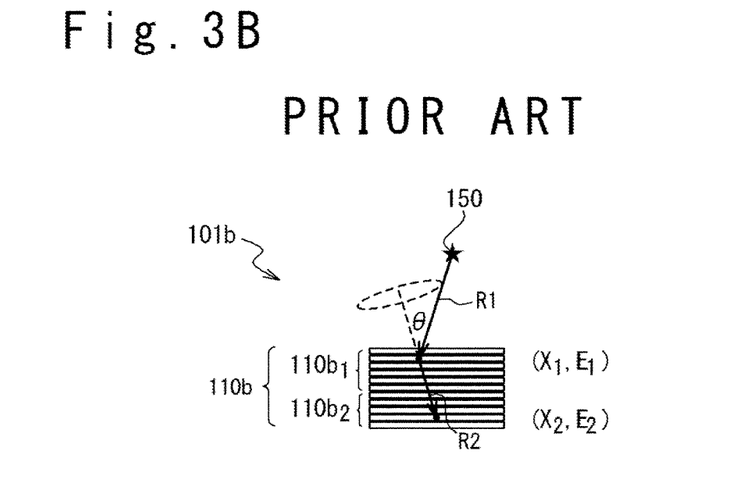
FIG. 3B is a diagram schematically showing the structure of the Compton camera of Non-Patent Literature 2.

Also, a Compton camera is disclosed in Non-Patent Literature 2 (http://www.jaxa.jp/press/2012/03/20120329_compton_1.pdf). The Compton camera is a camera which can measure an incidence direction of an incident radiation (e.g. a gamma ray) by using the Compton scattering. The incidence direction may be visualized by using an optional display unit. FIG. 3A is a diagram schematically showing the operation principle of this Compton camera. The Compton camera 101b can determine the energy E1+E2 and arrival direction θ of an incident radiation R1 at a same time, based on the measured position X1 and energy E1, and the measured position X2 and energy E2. In this case, the position X1 and the energy E1 indicate the scattering position X1(x1, y1, z1) and the energy E1 given to an electron from the radiation R1 when the radiation R1 is Compton-scattered with the electron in a scattering layer 110b1. Also, the position X2 and the energy E2 are the absorption position X2(x2, y2, z2) and the absorption energy E2 when the Compton-scattered radiation R2 is subjected to the photoelectric absorption in an absorption layer 110b2. Then, a position or kind of a radiation source 150 and so on are estimated based on the information of them. As shown in FIG. 3B, the incident radiation R1 is scattered at the position X1 of the plurality of scattering layers (Si) 110b1 to give the energy E1, and the scattered radiation R2 is absorbed at the position X2 of the plurality of absorption layers (CdTe) 110b2 to give the energy E2. As a result, the energy and the arrival direction θ of the incident radiation are determined at a same time based on (X1, E1) and (X2, E2). Then, the position or kind of the radiation source 150 and so on are estimated based on the information of them.

Figure 4:
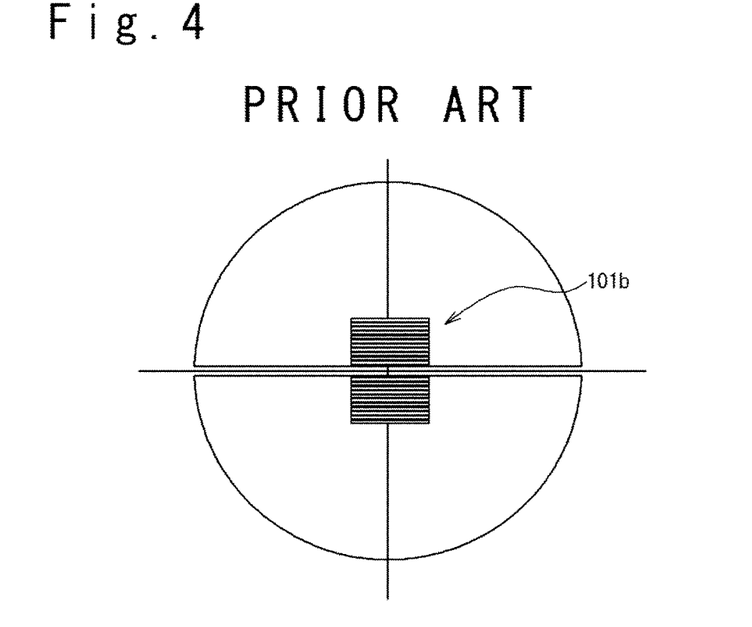
FIG. 4 is a diagram schematically showing an operation of the Compton camera of FIG. 3B.

The Compton camera 101b can detect radiations from the full circumference direction (viewing angle: 360°; strictly, a solid angle 4π steradian [sr]) theoretically. However, the Compton camera 101b has the structure in which the scattering layer 110b1 is arranged in the front of the camera (in the incident direction) and the absorption layer 110b2 is arranged in the rear of it. In this case, comparing the detection efficiency of a hemisphere in the front of the camera (viewing angle: 180°; strictly, a solid angle 2π steradian) with the detection efficiency of the hemisphere in the rear of the camera (viewing angle: 180°; strictly, a solid angle 2π steradian), the detection efficiency of the hemisphere in the rear of the camera becomes small extremely (e.g. about 1/10). Therefore, the viewing angle in case of practical use of the Compton camera 101b is 180°, and practically, only the radiation from the direction of hemisphere (2π [sr]) can be detected. Therefore, to measure the full circumference direction (viewing angle: 360°; 4π [sr]), for example, the measurement of at least twice need in the Compton camera 101b as shown in FIG. 4.

CITATION LIST

[Patent Literature 1] JP-2013-33009A
[Non-Patent Literature 1] http://www.hitachi-ce.co.jp/product/gamma_detector/the product information: gamma camera (radiation measurement apparatus), Hitachi Consumer Electronics Inc., (Searched on Oct. 29, 2013)
[Non-Patent Literature 2] http://www.jaxa.jp/press/2012/03/20120329_compton_1.pdf, (attached papers 1 of press release: about the proof examination (Mar. 29, 2012) to visualization of radioactive substances by "super-wide angle Compton camera": the space aerial studies and development mechanism (Searched on Oct. 29, 2013)

SUMMARY OF THE INVENTION

An object of the present invention is to provide a detector for a Compton camera and the Compton camera in which the number of measurement equipments can be reduced or the number of times of measurement can be reduced when measuring radiations.

A detector for a Compton camera according to some embodiments includes a first radiation scattering layer, a second radiation scattering layer, and a radiation absorption layer which is disposed between the first radiation scattering layer and the second radiation scattering layer. The first radiation scattering layer and the radiation absorption layer configure at least a part of a first detector, and the second radiation scattering layer and the radiation absorption layer configure at least a part of a second detector.

A Compton camera according to some embodiments includes a detector for a Compton camera and an information processing unit. The detector for the Compton camera includes the above-mentioned structure. The information processing unit calculates a position and radiation energy of a radiation source based on a signal outputted from the second radiation scattering layer and the radiation absorption layer of the detector for the Compton camera or a signal outputted from a first radiation scattering layer and the radiation absorption layer in response to an incident radiation.

According to some embodiments, when measuring radiation, the number of measurement equipments can be reduced, or the number of times of measurement by measurement equipment can be reduced.

BRIEF DESCRIPTION OF THE DRAWINGS

The attached drawings are incorporated into the Description to assist the description of embodiments. Note the drawings should not be interpreted to limit the present invention to the illustrated examples and the described examples.

DESCRIPTION OF THE EMBODIMENTS

Hereinafter, a detector for a Compton camera and the Compton camera according to some embodiments will be described with reference to the attached drawings. In order to provide the comprehensive understanding of embodiments, many detailed specific items are disclosed for the purpose of the description in the following detailed description. However, it would be apparent that one or plural embodiments can be executed without these detailed specific items.

Figure 5:
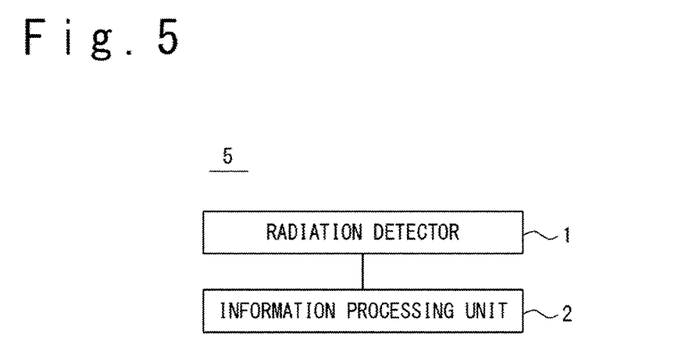
FIG. 5 is a block diagram showing a structural example of a Compton camera according to some embodiments.

The structure of the Compton camera according to some embodiments will be described. FIG. 5 is a block diagram showing a structural example of the Compton camera according to some embodiments. The Compton camera 5 includes a radiation detector 1 and an information processing unit 2. The radiation detector (the detector for the Compton camera) 1 is a detector for the radiation which is used in the Compton camera 5. The radiation detector detects incident radiation and outputs a signal corresponding to the incident radiation to the information processing unit 2. The details of radiation detector 1 are described later. The information processing unit 2 calculates a position of a radiation source and radiation energy based on the signal outputted from the radiation detector 1. The information processing unit 2 may be a computer which operates based on a program stored in a storage unit, or may be a hardware unit (an exclusive-use data processing circuit) or may be a combination of both.

Figure 6:
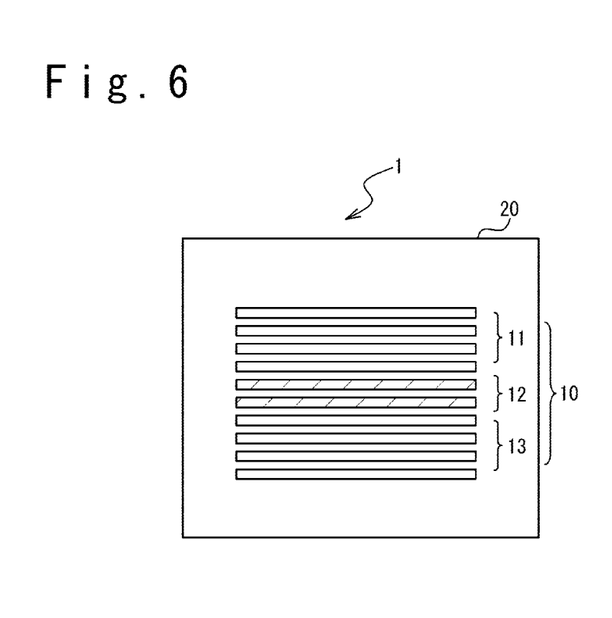
FIG. 6 is a diagram schematically showing a structural example of a radiation detector according to some embodiments.

FIG. 6 is a schematic diagram showing a structural example of the radiation detector 1 according to some embodiments. The radiation detector 1 includes a first radiation scattering layer 11, a second radiation scattering layer 13 and a radiation absorption layer 12.

The first radiation scattering layer 11 is a layer for Compton-scattering the radiation (e.g. gamma ray). The first radiation scattering layer 11 is disposed on the one side with respect to the radiation absorption layer 12 and may be formed from one layer or a stacking layer in which a plurality of layers are stacked. The first radiation scattering layer 11 Compton-scatters the radiation from a hemisphere (a solid angle $2\pi$ [sr]) on the one side with respect to the radiation absorption layer 12. The first radiation scattering layer 11 is exemplified by a detector formed of silicon (Si) which is a material having a high scattering ability for the radiation. The first radiation scattering layer 11 is modularized every layer. In other words, the first radiation scattering layer 11 is possible to detect an interaction with gamma ray every layer. When the scattering has occurred, the first radiation scattering layer 11 can output a scattering position in the scattering layer X(x, y), a position (z) of the scattering layer in the radiation detector 1, and a value corresponding to energy E given (absorbed) through the scattering.

The second radiation scattering layer 13 has the same structure and function as the first radiation scattering layer 11. However, the second radiation scattering layer 13 is disposed on the other side (on an opposite side to the first radiation scattering layer 11) with respect to the radiation absorption layer 12. The second radiation scattering layer 13 Compton-scatters the radiation from the hemisphere (the solid angle $2\pi$ [sr]) on the other side with respect to the radiation absorption layer 12.

The radiation absorption layer 12 is a layer for photoelectric absorption of the Compton scattered radiation in the first radiation scattering layer 11 and the second radiation scattering layer 13. The radiation absorption layer 12 is provided between the first radiation scattering layer 11 and the second radiation scattering layer 13 and may be formed from one layer or plural layers that are stacked. The radiation absorption layer 12 is exemplified by a detector which is formed of cadmium tellurium (CdTe) or cadmium zinc tellurium (CdZnTe), which is material with a high absorptive ability of photons. The radiation absorption layer 12 is modularized for every layer. In other words, the radiation absorption layer 12 is possible to detect an interaction with gamma ray for every layer. When the interaction with the gamma ray has occurred, the radiation absorption layer 12 output an absorption position X(x, y) in the absorption layer, a position (z) of the absorption layer in the radiation detector 1, and a value corresponding to energy E given (absorbed) through the absorption.

The first radiation scattering layer 11, the second radiation scattering layer 13 and the radiation absorption layer 12 are arranged in parallel to each other and in a predetermined pitch.

In this way, the radiation detector 1 according to some embodiments includes the first radiation scattering layer 11 that Compton-scatters a radiation from the hemisphere on the one side (the solid angle $2\pi$ [sr]) with respect to the radiation absorption layer 12 and the second radiation scattering layer 13 that Compton-scatters the radiation from the hemisphere (the solid angle $2\pi$ [sr]) on the other side with respect to the same. Therefore, the radiation detector 1 is possible to equalize the detection efficiency from the hemisphere on the one side to the detection efficiency from the hemisphere on the other side. As a result, the full circumference ($4\pi$ [sr]) can be detected through once detection with one detector for the Compton camera. Thus, when measuring the radiation, the number of measurement equipments can be reduced, and the number of times of the measurement by using the measurement equipments can be reduced.

At this time, the radiation absorption layer 12 is used commonly by the first radiation scattering layer 11 and the second radiation scattering layer 13. In other words, the radiation absorption layer 12 is shared between a detector formed from the first radiation scattering layer 11 and the radiation absorption layer 12 (a first detector) and a detector formed from the second radiation scattering layer 13 and the radiation absorption layer 12 (a second detector). Thus, the number (or the thickness) of radiation absorption layers can be relatively reduced for the radiation absorption layer 12 of one detector. As a result, while improving the detection efficiency to the full circumference direction (the solid angle $4\pi$ [sr]), the increase of the size and cost of the radiation detector 1 can be restrained. Note that when the number (or thickness) of radiation absorption layers 12 is not relatively reduced, the number (or the thickness) of radiation absorption layers 12 relatively increases so that the radiation scattered in the first radiation scattering layer 11 and the second radiation scattering layer 13 can be surely subjected to the photoelectric absorption.

It is desirable that the number of first radiation scattering layers 11 and the number of second radiation scattering layers 13 are equal to each other, as far as there are no special circumstances as in such a case that a radiation quantity from a hemisphere of the one of the sides and a radiation quantity from a hemisphere of the other side are different greatly. In this way, the detection efficiency of the radiation from the hemisphere on the side of the first radiation scattering layer 11 and the detection efficiency of the radiation from the hemisphere on the side of the second radiation scattering layer 13 can be made equal.

Also, it is desirable the first radiation scattering layer 11, the second radiation scattering layer 13 and the radiation absorption layer 12 are sparsely arranged to be the less number of layers when the radiation quantity is high. This is because there is a fear that the signals as the result of scattering increase and saturate when the number of layers is more and the layers are densely arranged. On the other hand, it is desirable that the number of layers is increased, and the layers are densely arranged, when the radiation quantity is low. This is because the detection efficiency is reduced when the number of layers is decreased, and the layers are sparsely arranged. In an example of FIG. 6, the number of first radiation scattering layers 11, the number of second radiation scattering layers 13 and the number of radiation absorption layers 12 are 4 layers, 4 layers and 2 layers, respectively.

Figure 7:
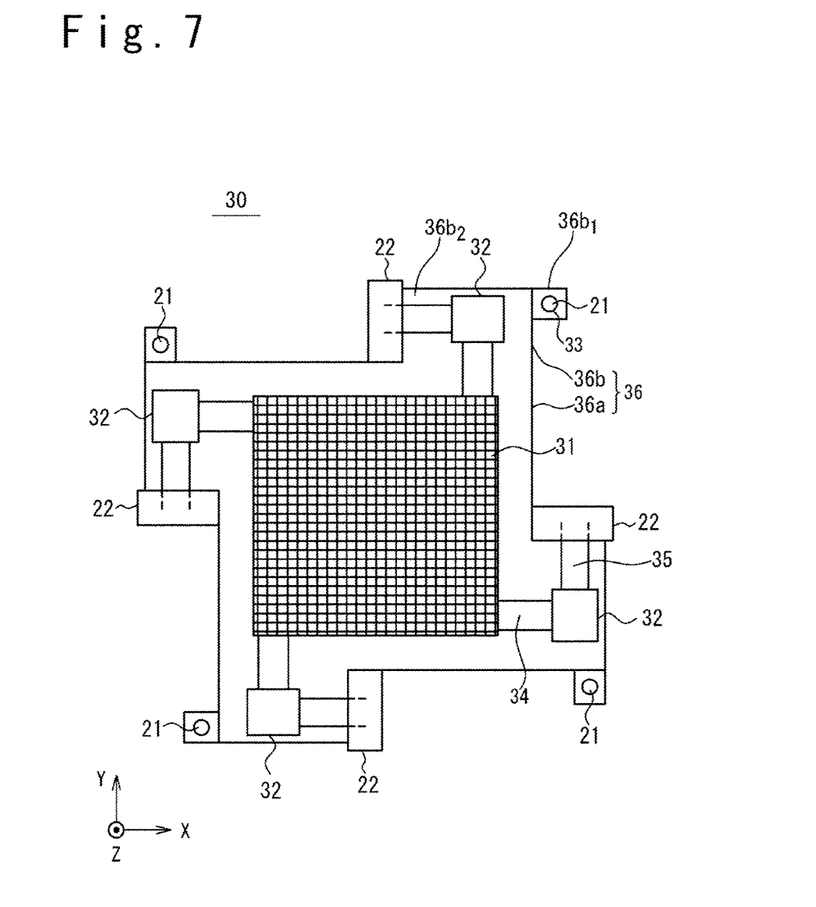
FIG. 7 is a plan view schematically showing a structural example of a module of the radiation detector according to some embodiments.

As mentioned above, the first radiation scattering layer 11, the second radiation scattering layer 13 and the radiation absorption layer 12 are modularized for every layer. FIG. 7 is a plan view schematically showing a configuration example of a module. A module 30 includes a sensor section 31, a detecting section 32 and a tray 36. The configuration of module 30 is same except for the sensor section 31 over the first radiation scattering layer 11, the second radiation scattering layer 13 and the radiation absorption layer 12.

The tray 36 holds the sensor section 31 and the detecting section 32 in predetermined positions to the Z direction in the radiation detector 1. The tray 36 includes a first portion 36a and a plurality of second portions 36b (four in an example of FIG. 7). The first portion 36a is provided in a center of the tray 36 and has the shape by which the sensor section 31 can be mounted or formed. The plurality of second portions 36b are provided in almost the equal interval around the first portion 36a and has the shape by which the detecting section 32 can be mounted or formed. In other words, the sensor section 31 is located in the first portion 36a and the detecting section 32 is located in each of the plurality of second portions 36b. The number of second portions 36b is increased or decreased depending on the number of detecting sections 32. The sensor section 31 and the plurality of detecting sections 32 are electrically connected.

The end section 36b1 of the second portion 36b includes an opening 33. A supporting member 21 which extends from a pedestal (not shown) disposed for every second portion 36b to the Z direction penetrates through the opening 33. Also, the other end section 36b2 of the second portion 36b is inserted into a supporting member 22 which extends from the pedestal (not shown) disposed for every second portion 36b to the Z direction. In this way, because each of the second portions 36b is held by the supporting members 21 and 22, the tray 36 can hold the sensor section 31 and the detecting section 32 in a predetermined position to the Z direction.

The sensor section 31 outputs an electric signal showing a position on the XY plane where radiation (e.g. gamma ray) is subjected to the Compton scattering or the photoelectric absorption and a quantity corresponding to the magnitude of the energy of the absorption. The sensor section 31 includes a detection layer, a first surface electrode and a second surface electrode (not shown).

The detection layers in the first radiation scattering layer 11 and the second radiation scattering layer 13 are layers to scatter the radiation and are exemplified by semiconductor layers. For example, the semiconductor layer is exemplified by a silicon (Si) layer. A first surface electrode is a film formed in a grid form in the XY plane to cover one of the surfaces of the detection layer and is exemplified by a conductive layer. For example, when the semiconductor layer is the silicon (Si) layer, the conductive layer is exemplified by an aluminum (Al) layer. A second surface electrode is a film formed on the XY plane to cover the other surface of the detection layer and is exemplified by the conductive layer. For example, when the semiconductor layer is the silicon (Si) layer, the conductive layer is exemplified by the aluminum (Al) layer.

When the radiation is scattered by the semiconductor layer in the first radiation scattering layer 11 or the second radiation scattering layer 13, the scattering position on the XY plane is detected as a position on the first surface electrode which receives the electric signal caused by the scattering. Also, a quantity corresponding to the magnitude of the energy given through the scattering is detected as an electric charge quantity by the first surface electrode.

On the other hand, a detection layer in the radiation absorption layer 12 is a layer to absorb radiation and is exemplified by the semiconductor layer. For example, the semiconductor layer is exemplified by a cadmium tellurium (CdTe) layer or a cadmium zinc tellurium (CdZnTe) layer. The first surface electrode is a film formed in the grid form on the XY plane to cover one of the surfaces of the detection layer, and is exemplified by a conductive layer. For example, when the semiconductor layer is the cadmium tellurium (CdTe) layer or the cadmium zinc tellurium (CdZnTe) layer, the conductive layer is exemplified by platinum (Pt). The second surface electrode is a film formed fully on the XY plane to cover the other surface of the radiation detection layer, and is exemplified by the conductive layer. For example, when the semiconductor layer is the cadmium tellurium (CdTe) layer or the cadmium zinc tellurium (CdZnTe) layer, the conductive layer is exemplified by an indium (In) layer.

When the radiation is subjected to the photoelectric absorption by the semiconductor layer in the radiation absorption layer 12, the position of the absorption is detected as a position on the first surface electrode which receives an electric signal generated through the absorption. Also, a quantity corresponding to the energy given through the absorption is detected as an electric charge quantity detected by the first surface electrode.

Note that the electrode shape of the first surface electrode and that of the second surface electrode are not symmetrical in the sensor section 31. However, even if the radiation is incident to the sensor section 31 from which side of the surface electrodes, the radiation never undergoes any influence due to these surface electrodes and there is no influence to the scattering and the absorption of the radiation in the sensor section 31. Note that the shape of the first surface electrode (of the grid form in this example) and that of the second surface electrode (fully covered surface in this example) and the shape (square in this example) of the sensor section 31 are not limited to the above-mentioned examples.

Also, the sensor section 31 may be a radiation detector of another kind. As the radiation detector, a strip-type detector is exemplified. The sensor section 31 includes a detection layer, a first surface electrode and a second surface electrode (not shown). The first surface electrode is a plurality of films formed in a stripe shape extending in parallel to the X direction to cover one of the surfaces of the detection layer. The first surface electrode is exemplified by an aluminum (Al) layer when the detection layer is the cadmium tellurium (CdTe) layer. The second surface electrode may be a plurality of films formed in a stripe shape extending in parallel to the Y direction to cover the other surface of the detection layer. The second surface electrode is exemplified by a platinum (Pt) layer when the detection layer is the cadmium tellurium (CdTe) layer.

The detecting section 32 receives through a wiring line 34, the electric signal showing a position and a quantity corresponding to the energy which is outputted from the sensor section 31. Then, the detecting section 32 outputs a detection signal corresponding to the electric signal through a wiring line 35 to the information processing unit 2. In an example of FIG. 7, the sensor section 31 is divided into four areas and includes the detecting section 32 for every area. However, the embodiment is not limited to the example.

Figure 8:
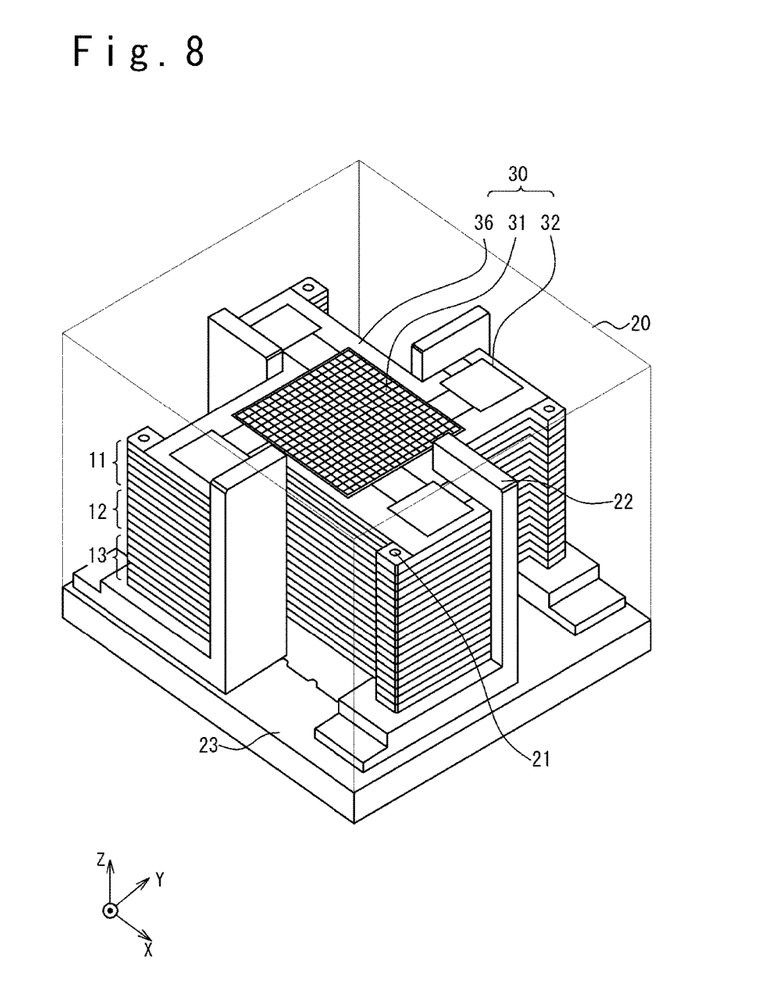
FIG. 8 is a perspective view schematically showing a structural example of the radiation detector in which modules according to some embodiments are stacked.

FIG. 8 is a perspective view schematically showing a configuration example of the radiation detector in which the modules are stacked. In the radiation detector 1, a plurality of modules 30 (the first radiation scattering layer 11, the radiation absorption layer 12 and the second radiation scattering layer 13) are stacked in a housing 20. For example, in an example of FIG. 8, 7 second radiation scattering layers 13, 6 radiation absorption layers 12, and 7 first radiation scattering layers 11 are stacked and arranged from the bottom in the Z direction. Each module 30 is fixed on a predetermined position in the housing 20 by the supporting members 21 and 22 extending from the pedestal 23 to the Z direction. If the modules 30 are stacked continuously without any space into the Z direction, the modules 30 can be densely stacked. Or, when the module fixation points are densely arranged to support the modules 30 by the supporting members 21 and 22, the modules 30 are densely stacked. Also, when the module fixation points are sparsely arranged, the modules 30 can be sparsely stacked.

The position of the module 30 to the Z direction can be specified as a position of the module 30 which is supported by the supporting members 21 and 22. Therefore, the position X of the Compton scattering or the photoelectric absorption is specified based on a position (z) of the z direction from the position where the module 30 is supported by the supporting members 21 and 22, and specified from a position (x, y) of the X coordinate and the Y coordinate in a position of the first surface electrode of the sensor section 31 of each module 30.

Figure 9:
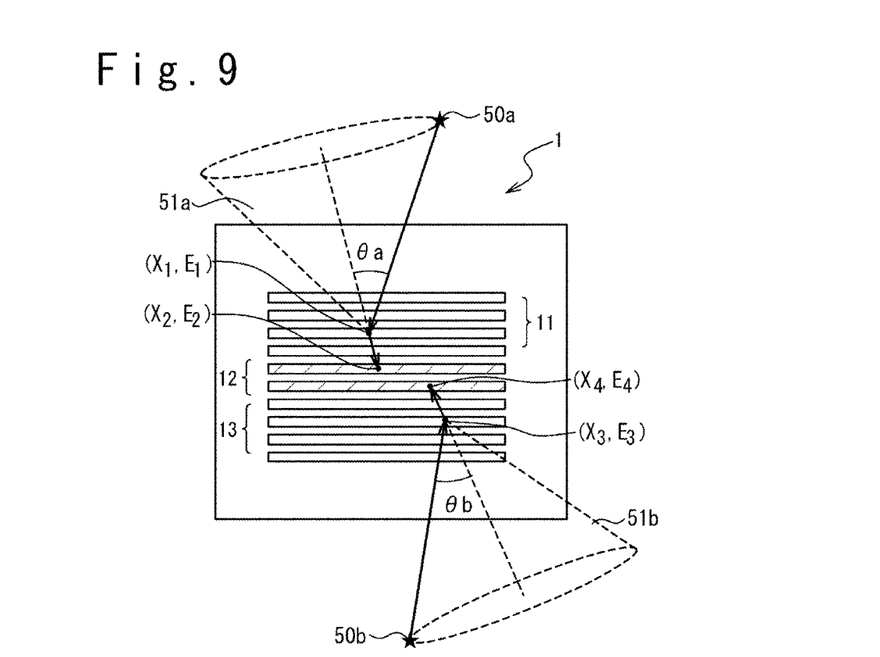
FIG. 9 is a diagram schematically showing operation principle of the Compton camera according to some embodiments.
Figure 10:
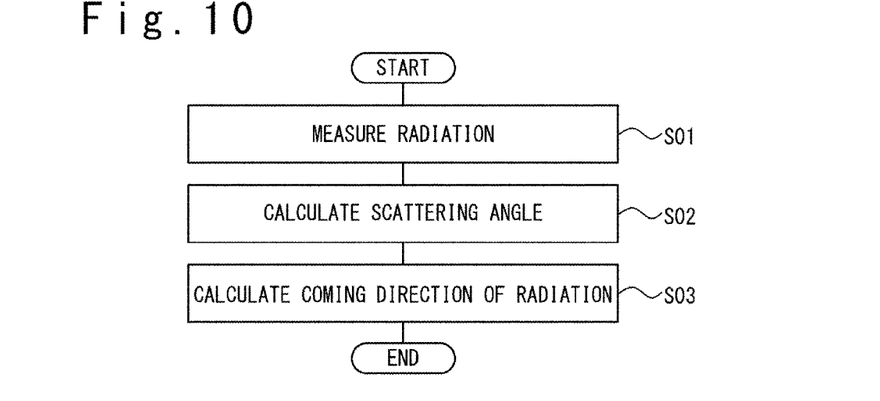
FIG. 10 is a flow chart showing the operation of the Compton camera according to some embodiments.

Next, the operation of the Compton camera according to some embodiments will be described. FIG. 9 is a schematic diagram showing the operation principle of the Compton camera according to some embodiments. Also, FIG. 10 is a flow chart showing the operation of the Compton camera according to some embodiments.

First, a case is considered where a radiation source 50a is on the side of the first radiation scattering layer 11.

The user turns the radiation detector 1 of the Compton camera 5 to a predetermined direction. The radiation detector 1 measures a radiation (e.g. gamma ray) from the radiation source 50a in front of the detector 1 (Step S01).

Specifically, the radiation from the radiation source 50a in the front direction is incident on the radiation detector 1, and is first subjected to the Compton scattering almost in one of the plurality of first radiation scattering layers 11 of the radiation detector 1. At this time, the first radiation scattering layer 11 (z1) in which the Compton scattering has occurred outputs a signal showing the position (x1, y1) in which the Compton scattering has occurred in the sensor section 31, and a change value of the electric charge corresponding to the energy E1 given from the radiation. The detecting section 32 of the first radiation scattering layer 11 outputs a signal showing the change value of the electric charge (corresponding to energy E1) and the position X1(x1, y1, z1), to the information processing unit 2.

After that, the scattered radiation is photoelectrically absorbed by either of the plurality of radiation absorption layers 12 of the radiation detector 1. At this time, the radiation absorption layer 12 (z2) outputs a signal showing the position (x2, y2) where the absorption is carried out in the sensor section 31 and a change value of the electric charge corresponding to absorbed energy E2. The detecting section 32 of the radiation absorption layer 12 outputs a signal showing the change value of the electric charge (corresponding to the energy E2) and the position X2(x2, y2, z2) to the information processing unit 2.

The scattering in the first radiation scattering layer 11 and the absorption in the radiation absorption layer 12 occur approximately at a same time. Therefore, it is possible to determine that two events which have occurred approximately at the same time in a time series are the continuous events due to one radiation. Therefore, it is possible to distinguish the two events from the other events of scattering and absorption which occur in the first radiation scattering layer 11 and the radiation absorption layer 12 and events of scattering and absorption which occur in the second radiation scattering layer 13 and the radiation absorption layer 12.

Next, the information processing unit 2 converts the change value of the electric charge from the first radiation scattering layer 11 into energy E1 and converts the change value of the electric charge from the radiation absorption layer 12 to energy E2. Based on (position, energy)=(X1, E1) and (X2, E2), the scattering angle $\theta_a$ is calculated (Step S02). In this case, the energy E01 of the radiation source 50a is shown by the following equation (1):

$$E01=E1+E2 \quad (1)$$

Also, in the Compton scattering, the following equation (2) is met about the scattering angle $\theta_a$:

$$E2=E01/(1+E01(1-\cos\theta_a)/mC^2) \quad (2)$$

Therefore, the following equation (3) is derived from the equation (1) and the equation (2):

$$\cos\theta_a=1-mC^2/E2+mC^2/(E1+E2) \quad (3)$$

That is, if substituting E1, E2 into the equation (3), the scattering angle $\theta_a$ is determined. Then, the information processing unit 2 carries out the above steps S01-S02 about the plurality of radiations from the radiation source 50a and gets the plurality of scattering angles $\theta_a$. Note that m means the mass of electron and C means speed of light.

Next, the information processing unit 2 calculates the direction of the arrival from the radiation source 50a based on the plurality of scattering angles $\theta_a$ (Step S03).

Here, the incidence direction of the radiation (the direction of the radiation source 50a) is calculated to be within the following range from the scattering angle $\theta_a$, the position X1 and the position X2. That is, the radiation source 50a is on the side of a cone 51a which has the position X1 as a vertex, the direction of a line linking the position X2 and position X1 as the direction of the height and a generatrix extending in the scattering angle $\theta_a$ from the position X1 based on the direction of the height. Accordingly, the range to the incidence direction corresponds to the side of the cone 51a. A plurality of cones can be determined if the plurality of scattering angles $\theta_a$ are respectively calculated about the plurality of radiations radiated from the radiation source 50a (steps S01-S02). It is possible to calculate the direction corresponding to the position where the plurality of cones overlap, as a final direction of the radiation source 50a. At the time, the energy of the incident radiation from the radiation source 50a is, for example, E01=E1+E2.

On the other hand, in case that a radiation source 50b is on the side of the second radiation scattering layer 13, the same argument is met.

When the user turns the radiation detector 1 of the Compton camera 5 to a predetermined direction, the radiation detector 1 measures a radiation (e.g. gamma ray) from the radiation source 50b which is located in the rear direction (Step S01).

Specifically, the radiation from the radiation source 50b in the rear direction is incident on the radiation detector 1. First, the radiation is Compton-scattered by either of the plurality of second radiation scattering layers 13 of the radiation detector 1. At this time, the second radiation scattering layer 13 (z3) outputs a signal showing a position (x3, y3) where the scattering has occurred in the sensor section 31 and a change value of the electric charge corresponding to energy E3 given by the radiation. The detecting section 32 of the second radiation scattering layer 13 outputs a signal showing the change value of the electric charge (corresponding to energy E3) and the position X3(x3, y3, z3) to the information processing unit 2.

After that, the scattered radiation is photoelectrically-absorbed by either of the plurality of radiation absorption layers 12 of the radiation detector 1. At this time, the radiation absorption layer 12 (z4) outputs a signal showing the position (x4, y4) where the absorption has occurred at the sensor section 31, and the change value of the electric charge corresponding to the absorbed energy E4. The detecting section 32 of the radiation absorption layer 12 outputs a signal showing the change value of the electric charge (corresponding to energy E4) and the position X4(x4, y4, z4) to the information processing unit 2.

The scattering in the second radiation scattering layers 13 and the absorption in the radiation absorption layer 12 occur approximately at a same time. Therefore, it is possible to determine that two events which have occurred approximately at the same time in a time series are the continuous events due to one radiation. Therefore, the other scattering and other absorption which occur in the second radiation scattering layer 13 and the radiation absorption layer 12 are possible to distinguish from the scattering and absorption which occur in the first radiation scattering layer 11 and the radiation absorption layer 12.

Next, the information processing unit 2 converts the change value of the electric charge from the second radiation scattering layer 13 into the energy E3 and converts the change value of the electric charge from the radiation absorption layer 12 into the energy E4. Based on (position, energy)=(X3, E3) and (X4, E4), the scattering angle $\theta_b$ is calculated (Step S02).

In this case, the energy E02 of the radiation source 50b is shown by the following equation (4):

$$E02=E3+E4 \quad (4)$$

Also, the following equation (5) is met about the scattering angle $\theta_b$ in the Compton scattering:

$$E4=E02/(1+E02(1-\cos\theta_b)/mC^2) \quad (5)$$

Therefore, the following equation (6) is derived from the equation (4) and the equation (5).

$$\cos\theta_b=1-mC^2/E4+mC^2/(E3+E4) \quad (6)$$

That is, if substituting E3 and E4 into the equation (6), the scattering angle $\theta_b$ can be determined.

Then, the information processing unit 2 carries out the above steps S01-S02 to the plurality of radiations from the radiation source 50b to obtain the plurality of scattering angles $\theta_b$. Note that m means the mass of electron and c means speed of light.

Next, the information processing unit 2 calculates the direction of the arrival of the radiation from the radiation source 50b based on the plurality of scattering angles $\theta_b$ (Step S03).

Here, the incidence direction of the radiation (the direction to the radiation source 50b) is calculated to be within the following range from the scattering angle $\theta_b$, the position X3 and the position X4. That is, the radiation source 50b is on the side surface of a cone 51b which has the position X3 as a vertex, the direction of the line which links the position X4 and the position X3 as the direction of the height, the bus bar extending in the scattering angle $\theta_b$ from the position X3 as a reference of the direction of the height. Accordingly, the range in the incidence direction corresponds to the side surface of the cone 51b. If a plurality of scattering angles $\theta_b$ are respectively calculated about a plurality of radiations radiated from the radiation source 50b (Steps S01-S02), a plurality of cones can be determined. It is possible to calculate the direction corresponding to the position where the plurality of cones overlap, as the final direction of of the radiation source 50b. At this time, the energy of the incident radiation of the radiation source 50b is, for example, E02=E3+E4.

As mentioned above, the Compton camera according to some embodiments operates.

In the Compton camera 5 according to some embodiments, a radiation is incident on the radiation detector 1 from the radiation source 50a in a front direction. The radiation is Compton-scattered in one of the plurality of first radiation scattering layers 11, and is photoelectrically-absorbed by one of the plurality of radiation absorption layers 12. In this case, the scattering angle $\theta_a$ and the energy E01 are calculated and the position of the radiation source 50a can be specified. In addition to it, in the Compton camera 5, a radiation is incident on the radiation detector 1 from the radiation source 50b in a rear direction. The radiation is Compton-scattered by one of the plurality of second radiation scattering layers 13, and is photoelectrically-absorbed by one of the plurality of radiation absorption layers 12. In this case, the scattering angle $\theta_b$ and the energy E02 are calculated and the position of the radiation source 50b can be specified. That is, in the Compton camera 5, the radiation source 50b which is within the range of the solid angle $2\pi$ [sr] on the side of the second radiation scattering layer 13 can be measured by the radiation detector 1, in addition to the radiation source 50a which is within the range of the solid angle $2\pi$ [sr] on the side of the first radiation scattering layer 11. Therefore, the radiation sources in the range of the solid angle $4\pi$ [sr] can be specified at once by one Compton camera 5. Therefore, when the radiations should be measured, the number of measurement equipments can be reduced or the number of times of measurement by the measurement equipment can be reduced.

Figure 11A:
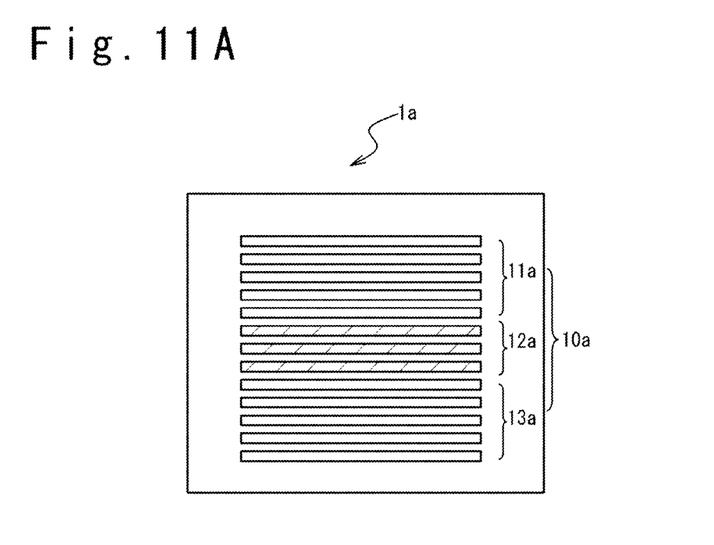
FIG. 11A is a diagram schematically showing a modification example of the structure of the radiation detector according to an embodiment.
Figure 11B:
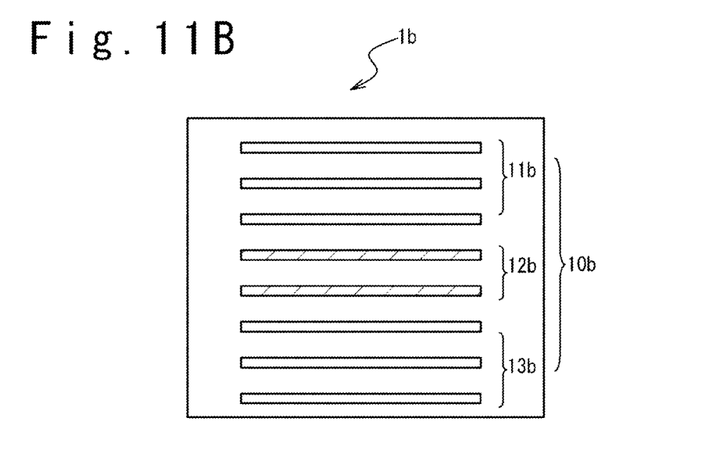
FIG. 11B is a diagram schematically showing another modification example of the structure of the radiation detector according to the embodiment.
Figure 11C:
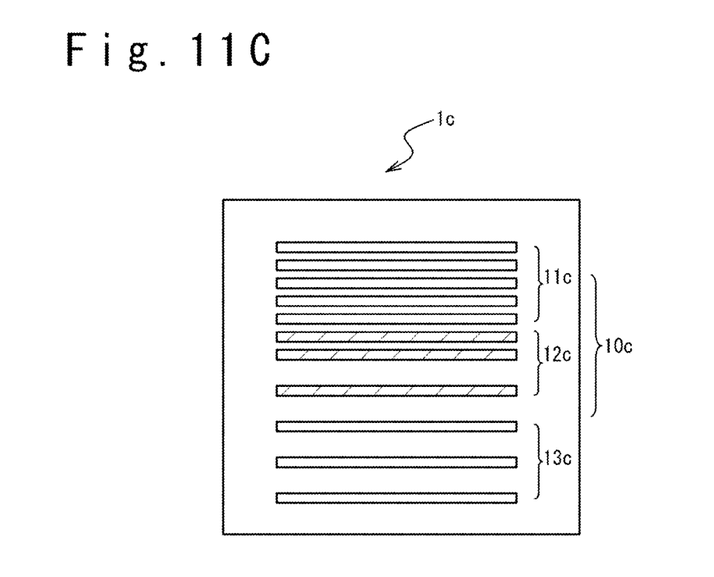
FIG. 11C is a diagram schematically showing further another modification example of the structure of the radiation detector according to the embodiment.

Note that the numbers of layers of the first radiation scattering layer 11, the second radiation scattering layer 13 and the radiation absorption layer 12 in the radiation detector 1, and the arranging method of them are optional. Some examples are shown below. FIG. 11A to FIG. 11C are schematic diagrams showing modification examples of the configuration of the radiation detector 1 according to the embodiments.

In the radiation detector 1a of FIG. 11A, the first radiation scattering layers 11a, the second radiation scattering layers 13a and the radiation absorption layers 12a are relatively densely stacked. In other words, the number of layers for every unit thickness is relative more. The radiation detector 1a has a feature that there is a high probability that the radiation is subjected to the Compton scattering in the first radiation scattering layers 11a and the second radiation scattering layers 13a, and is subjected to the photoelectric absorption (the detection sensitivity is high). Therefore, it is suitable in case where a radiation quantity of the measurement object is small. In an example of FIG. 11A, the first radiation scattering layer 11, the second radiation scattering layer 13 and the radiation absorption layer 12 are of 5 layers, of 5 layers and of 3 layers, respectively.

In the radiation detector 1b of FIG. 11B, the first radiation scattering layers 11b, the second radiation scattering layers 13b and the radiation absorption layers 12b are relatively sparsely stacked. In other words, the number of layers for every unit thickness is relative small. The radiation detector 1b has a feature that there is a low probability that the radiation is subjected to the Compton scattering in the first radiation scattering layers 11b and the second radiation scattering layers 13b, and subjected to the photoelectric absorption in the radiation absorption layers 12b (the detection sensitivity is low). Therefore, it is suitable in case that a radiation quantity of the measurement object is high. Also, the cost is low because the number of layers is little. In an example of FIG. 11B, the first radiation scattering layer 11, that the second radiation scattering layer 13 and the radiation absorption layer 12 are of 3 layers, of 3 layers and of 2 layers, respectively.

In the radiation detector 1c of FIG. 11C, the first radiation scattering layers 11c and the radiation absorption layers 12c on the side of the first radiation scattering layers 11c are relatively densely. On the other hand, the second radiation scattering layers 13c and the radiation absorption layers 12c on the side of the second radiation scattering layers 13c are relatively sparsely stacked. In other words, the number of layers for every unit thickness is relatively many on the side of the first radiation scattering layers 11c, and the number of layers for every unit thickness is relatively many on the side of the first radiation scattering layers 11c. The radiation detector 1c has a feature that there is a high probability that the radiation is Compton-scattered by the first radiation scattering layers 11c, and photoelectrically-absorbed by the radiation absorption layers 12c, and there is a low probability that the radiation is Compton-scattered by the second radiation scattering layers 13c, and photoelectrically-absorbed by the radiation absorption layers 12c. Therefore, a radiation quantity of the measurement object is low on one of the sides and high on the other side. In an example of FIG. 11c, the first radiation scattering layer 11, the second radiation scattering layer 13 and the radiation absorption layer 12 are of 5 layers, of 3 layers and of 3 layers, respectively.

Figure 11D:
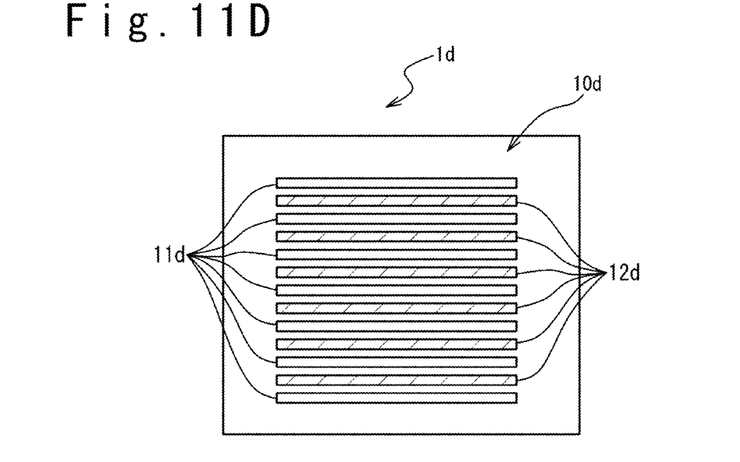
FIG. 11D is a diagram schematically showing still another modification example of the structure of the radiation detector according to the embodiment.

In the radiation detector 1d of FIG. 11D, the radiation scattering layers 11d and the radiation absorption layers 12d are alternately stacked one layer by one layer and the radiation scattering layers 11d are arranged as the outermost layers (the uppermost layer and the lowermost layer in FIG. 11D) of the radiation detector 1d. Therefore, the radiation scattering layers 11d excluding two of the outermost radiation scattering layers 11d (the radiation scattering layer 11d in the uppermost layer and the radiation scattering layer 11d in the lowermost layer) can be regarded as having the function of the first radiation scattering layer and the function of the second radiation scattering layer. The radiation scattering layer 11d arranged between two neighbor radiation absorption layers 12 can be said to be the radiation scattering layer which the first radiation scattering layer and the second radiation scattering layer are formed as a unified body (in the same body). Or, a combination of the radiation scattering layer 11d which functions as the first radiation scattering layer, the radiation absorption layer 12d and the other radiation scattering layer 11d which functions as the second radiation scattering layer, which are arranged in this order, is provided for a plurality of combinations. The radiation detector 1d is possible to function like the radiation detector 1 mentioned previously. Moreover, because the arrangement range of the radiation absorption layer 12 is wide, it becomes easier to absorb the Compton scattered radiation.

Note that the radiation scattering layer 11d and the radiation absorption layer 12d are alternately stacked one layer by one layer in FIG. 11D, but the radiation detector 1d is not limited to this example. In the radiation detector 1d, for example, a plurality of radiation scattering layers and a plurality of radiation absorption layers 12d may be alternately stacked or the number of layers of the radiation scattering layers 11d and the number of layers of the radiation absorption layers 12d may be different. The Compton scattered gamma ray having a large scattering angle can be detected easily by employing the structure in which the radiation scattering layers 11d and the radiation absorption layers 12d are alternately stacked, i.e. the structure in which the absorption layer is inserted between the scattering layers. Therefore, the effective area of the detector is improved.

The change of the detection sensitivity (detection efficiency) of the radiation detector 1 like this can be realized by, for example, increasing or decreasing the number of layers of the module 30 of the first radiation scattering layer 11, the second radiation scattering layer 13 and the radiation absorption layer 12, or by expanding or narrowing an interval between the modules 30. In the radiation detector according to some embodiments, the detection sensitivity can be changed freely according to the radiation quantity of the measurement object in this way.

For example, such a radiation detector 1 can be used for radiation measurement, X ray measurement, gamma ray measurement, material analysis, security, and resource investigation.

The present invention is not limited to each of the above embodiments. Each of the embodiments may be changed or modified appropriately in the range of the technique thought of the present invention. Also, various techniques used in the embodiment or the modification example can be applied to the other embodiment or the modification example, as long as the technical contradiction is not caused.

This application is based on Japanese Patent Application No. 2014-159046 which was filed on Aug. 4, 2014 and claims a priority of it. The disclosure thereof is incorporated herein by reference.

The invention claimed is:

1. A detector for a Compton camera, comprising:
a first radiation scattering layer;
a second radiation scattering layer; and
a radiation absorption layer disposed between the first radiation scattering layer and the second radiation scattering layer,
wherein the first radiation scattering layer and the radiation absorption layer configure at least a part of a first detector,
wherein the second radiation scattering layer and the radiation absorption layer configure at least a part of a second detector,
wherein the first radiation scattering layer Compton-scatters a radiation from a radiation source in a hemisphere on one side with respect to the radiation absorption layer, and
wherein the second radiation scattering layer Compton-scatters a radiation from a radiation source in a hemisphere on the other side with respect to the radiation absorption layer.

2. The detector according to claim 1, wherein, when a first radiation is scattered, the first radiation scattering layer outputs a first signal corresponding to a first position of the scattering and first energy given by the scattering,
wherein, when a second radiation is scattered, the second radiation scattering layer outputs a second signal corresponding to a second position of the scattering and second energy given by the scattering,
wherein the radiation absorption layer:
outputs a third signal corresponding to a third position where the absorption is carried out, and third energy by the absorption, when the first radiation having been scattered in the first radiation scattering layer is absorbed, and
outputs a fourth signal corresponding to a fourth position where the absorption is carried out and fourth energy of absorption, when the second radiation having been scattered in the second radiation scattering layer is absorbed.

3. The detector according to claim 1, wherein at least one of the first radiation scattering layer, the radiation absorption layer and the second radiation scattering layer is provided by plural layers.

4. The detector according to claim 3, wherein the number of layers of the first radiation scattering layer and the number of layers of the second radiation scattering layer are identical to each other.

5. The detector according to claim 1, further comprising:
a holding mechanism disposed to hold the first radiation scattering layer, the radiation absorption layer and the second radiation scattering layer in a stacked state.

6. The detector according to claim 5, wherein the holding mechanism holds the first radiation scattering layer, the radiation absorption layer and the second radiation scattering layer to be detachable.

7. The detector according to claim 1, wherein the first radiation scattering layer, which comprises at least one first scattering layer, the second radiation scattering layer, which comprises at least one second scattering layer, and the radiation absorption layer, which comprises at least one absorption layer, are alternately stacked, and
wherein the first radiation scattering layer and the second radiation scattering layer between adjacent two layers of the radiation absorption layer are unified to be one body.

8. The detector according to claim 1, further comprising:
plural layers of the radiation absorption layer; and
a radiation scattering layer in which the first radiation scattering layer and the second radiation scattering layer are unified, which are arranged between adjacent two layers of the radiation absorption layer.

9. A Compton camera comprising:
a detector for a Compton camera;
wherein the detector comprises:
a first radiation scattering layer;
a second radiation scattering layer; and
a radiation absorption layer disposed between the first radiation scattering layer and the second radiation scattering layer,
wherein the first radiation scattering layer and the radiation absorption layer configure at least a part of a first detector,
wherein the second radiation scattering layer and the radiation absorption layer configure at least a part of a second detector, wherein the first radiation scattering layer Compton-scatters a radiation from a radiation source in a hemisphere on one side with respect to the radiation absorption layer, and wherein the second radiation scattering layer Compton-scatters a radiation from a radiation source in a hemisphere on the other side with respect to the radiation absorption layer, and an information processing unit disposed to calculate a position of the radiation source and energy of the radiation, based on a signal outputted from the first radiation scattering layer and the radiation absorption layer or a signal outputted from the second radiation scattering layer and the radiation absorption layer, in the detector for the Compton camera in response to the radiation incident thereto.

10. The Compton camera according to claim 9, wherein, when a first radiation is scattered, the first radiation scattering layer outputs a first signal corresponding to a first position of the scattering and first energy given by the scattering, wherein, when a second radiation is scattered, the second radiation scattering layer outputs a second signal corresponding to a second position of the scattering and second energy given by the scattering, wherein the radiation absorption layer:

outputs a third signal corresponding to a third position where the absorption is carried out, and third energy by the absorption, when the first radiation having been scattered in the first radiation scattering layer is absorbed, and outputs a fourth signal corresponding to a fourth position where the absorption is carried out and fourth energy of absorption, when the second radiation having been scattered in the second radiation scattering layer is absorbed.

11. The Compton camera according to claim 9, wherein at least one of the first radiation scattering layer, the radiation absorption layer and the second radiation scattering layer is provided by plural layers.

12. The Compton camera according to claim 11, wherein the number of layers of the first radiation scattering layer and the number of layers of the second radiation scattering layer are identical to each other.

13. The Compton camera according to claim 9, further comprising:

a holding mechanism disposed to hold the first radiation scattering layer, the radiation absorption layer and the second radiation scattering layer in a stacked state.

14. The Compton camera according to claim 13, wherein the holding mechanism holds the first radiation scattering layer, the radiation absorption layer and the second radiation scattering layer to be detachable.

15. The Compton camera according to claim 9, wherein the first radiation scattering layer, which comprises at least one first scattering layer, the second radiation scattering layer, which comprises at least one second scattering layer, and the radiation absorption layer, which comprises at least one absorption layer, are alternately stacked, and wherein the first radiation scattering layer and the second radiation scattering layer between adjacent two layers of the radiation absorption layer are unified to be one body.

16. The Compton camera according to claim 9, further comprising:

plural layers of the radiation absorption layer; and a radiation scattering layer in which the first radiation scattering layer and the second radiation scattering layer are unified, which are arranged between adjacent two layers of the radiation absorption layer.

\* \* \* \* \*